(12) United States Patent
Paik

(10) Patent No.: US 9,407,744 B2  
(45) Date of Patent: Aug. 2, 2016

(54) APPARATUS AND METHOD FOR CONTROLLING POWER IN PORTABLE TERMINAL

(75) Inventor: Min-Chull Paik, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 779 days.

(21) Appl. No.: 13/618,631

(22) Filed: Sep. 14, 2012

(65) Prior Publication Data

US 2013/0088094 A1    Apr. 11, 2013

(30) Foreign Application Priority Data

Oct. 6, 2011    (KR) .......................... 10-2011-0101860

(51) Int. Cl.
*H01H 3/00* (2006.01)
*H04M 1/18* (2006.01)
*H04M 1/725* (2006.01)

(52) U.S. Cl.
CPC . *H04M 1/18* (2013.01); *H01H 3/00* (2013.01); *H04M 1/72519* (2013.01); *H04M 2250/12* (2013.01); *Y10T 307/779* (2015.04)

(58) Field of Classification Search
None
See application file for complete search history.

(56) References Cited

U.S. PATENT DOCUMENTS

| | | | | |
|---|---|---|---|---|
| 4,582,971 A * | 4/1986 | Ueda | ................... | H05B 6/6411 |
| | | | | 219/685 |
| 5,230,055 A * | 7/1993 | Katz et al. | ...................... | 713/300 |
| 5,889,466 A * | 3/1999 | Ferguson | ...................... | 340/602 |
| 7,557,466 B2 * | 7/2009 | Wong et al. | ................... | 307/118 |
| 2005/0252983 A1 * | 11/2005 | Acker | ................. | F24F 11/0001 |
| | | | | 236/44 R |
| 2009/0312070 A1 * | 12/2009 | Zhang et al. | ................... | 455/572 |
| 2011/0153469 A1 | 6/2011 | Mackenzie et al. | | |

FOREIGN PATENT DOCUMENTS

JP    2007251830 A  *  9/2007

* cited by examiner

*Primary Examiner* — Adi Amrany

(57) ABSTRACT

An apparatus performs a power control method for a portable terminal. The power control method includes measuring humidity around the portable terminal using a humidity sensor, and determining whether a flooding condition occurs based on the measured humidity. The method also includes turning off power of the portable terminal by releasing a connection with a battery that supplies power to the portable terminal when it is determined that the flooding condition occurs.

20 Claims, 2 Drawing Sheets

APPARATUS AND METHOD FOR CONTROLLING POWER IN PORTABLE TERMINAL

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Oct. 6, 2011 and assigned Serial No. 10-2011-0101860, the entire disclosure of which is hereby incorporated by reference.

TECHNICAL OF THE INVENTION

The present disclosure relates to a power control method of a portable terminal and an apparatus therefor.

BACKGROUND OF THE INVENTION

Because portable terminals are exposed to a variety of conditions during use of the portable terminals, it is an increasing phenomenon that the portable terminals encounter faults such as an error operation. For example, if a portable terminal is exposed to liquids or flooded, the internal components of the portable terminal are frequently damaged.

Hereinafter, a conventional flooding label attachment method will be described.

In preparation for flooding conditions of the portable terminal, a flooding label is attached to the portable terminal. However, the conventional flooding label attachment method only allows a determination of whether a fault of the portable terminal is caused by flooding. There is still a problem in that internal components of the portable terminal are not prevented from being damaged when the portable terminal is flooded.

Therefore, a method of preventing the internal components of the portable terminal from being damaged when the portable terminal is flooded is needed.

SUMMARY OF THE INVENTION

To address the above-discussed deficiencies of the prior art, it is a primary object to provide at least the advantages described below. Accordingly, an aspect of the present disclosure is to provide a method and apparatus for controlling power of a portable terminal.

Another aspect of the present disclosure is to provide a method and apparatus for sensing flooding conditions using a humidity sensor and automatically turning off power in the portable terminal.

Another aspect of the present disclosure is to provide a method and apparatus for blocking power supplied from a battery when sensing flooding conditions of a portable terminal.

In accordance with an aspect of the present disclosure, a power control method of a portable terminal is provided. The power control method includes measuring humidity around the portable terminal using a humidity sensor, and determining whether a flooding condition occurs based on the measured humidity. The method also includes turning off power of the portable terminal by releasing a connection with a battery that supplies power to the portable terminal when it is determined that the flooding condition occurs.

In accordance with another aspect of the present disclosure, a power control apparatus for a portable terminal is provided. The power control apparatus includes a humidity sensor for measuring humidity around the portable terminal. The power control apparatus also includes a controller configured to determine whether a flooding condition occurs based on the measured humidity, and to turn off power of the portable terminal by releasing, a connection with a battery that supplies power to the portable terminal when it is determined that the flooding condition occurs.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
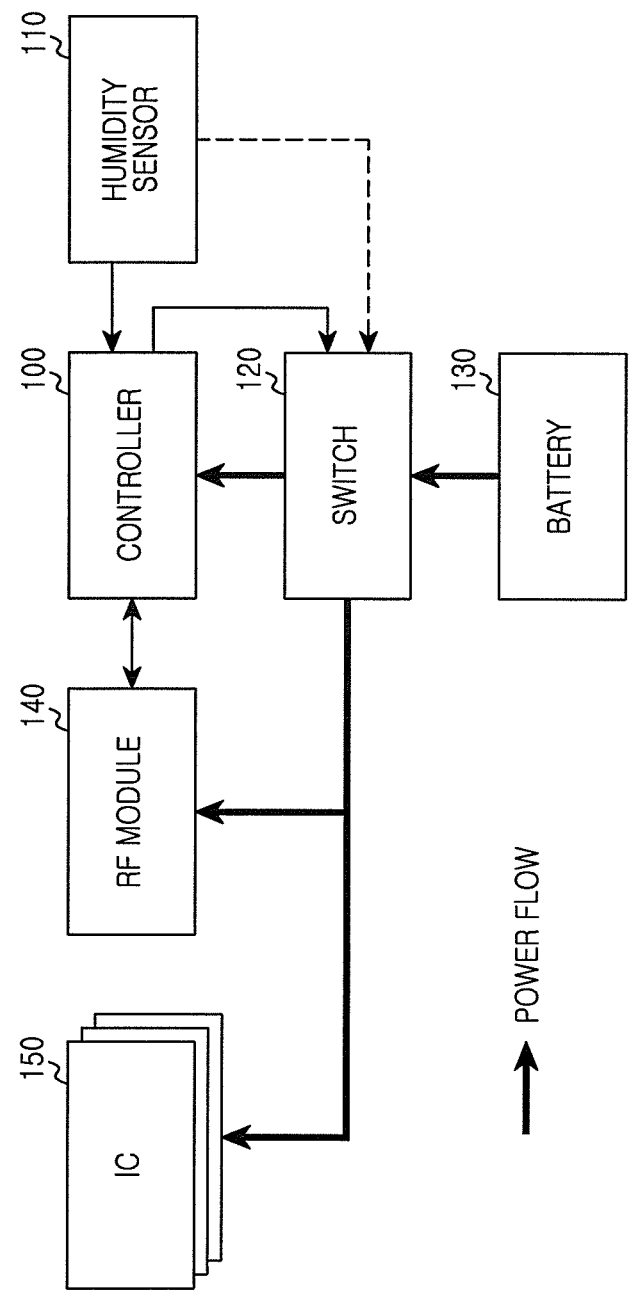
FIG. 1 is a block diagram illustrating a configuration of a portable terminal according to an embodiment of the present disclosure.
Figure 2:
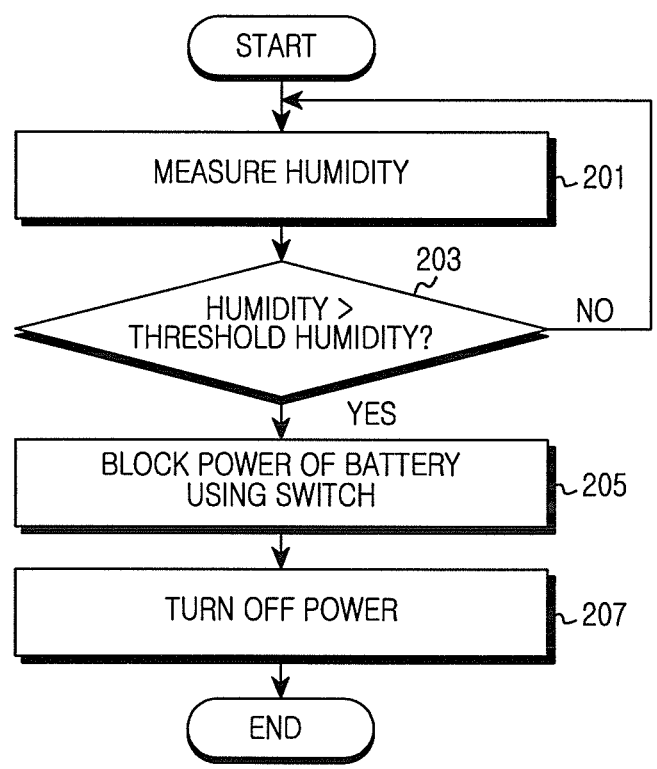
FIG. 2 is a flowchart illustrating a process of controlling power of a portable terminal according to an embodiment of the present disclosure.

FIGS. 1 and 2, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following description with reference to the accompanying drawings is provided to assist in a comprehensive understanding, of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a method and apparatus for sensing flooding conditions using a humidity sensor and automatically turning off power of a portable terminal in the portable terminal according to an embodiment of the present disclosure will be described in detail.

A portable terminal as described hereinafter may include all electronic devices that include a battery. For example, the portable terminal may be any portable electronic device such as an MPEG-1 Audio Layer 3 (MP3) player, a tablet Personal Computer (PC), a smart phone, a mobile internet device and a notebook.

FIG. 1 is a block diagram illustrating a configuration of a portable terminal according, to an embodiment of the present disclosure.

Referring to FIG. 1, the portable terminal includes a controller 100, a humidity sensor 110, a switch 120, a battery 130, a Radio Frequency (RF) module 140, and a plurality of Integrated Circuits (ICs) 150.

The controller 100 controls and processes an overall operation of the portable terminal. In accordance with an embodiment of the present disclosure, the controller 100 controls and processes functions for sensing flooding conditions and turning off power of the portable terminal. That is, the controller 100 turns off power of the portable terminal by determining whether flooding conditions occur based on a humidity value provided from the humidity sensor 110, controlling the switch 120 when the flooding conditions occur, blocking power supply from the battery 130, and turning off power of components included in the portable terminal.

That is, the controller 100 receives a current humidity value indicating flooding conditions around the portable terminal and compares the received current humidity value with a predetermined threshold humidity value. When the current humidity value is higher than the predetermined threshold humidity value, the controller 100 determines that flooding conditions have occurred or are occurring, and outputs a control signal for blocking power supply from the battery 130 to the switch 120. Alternatively, when the current humidity value is less than or equal to the predetermined threshold humidity, the controller 100 determines that flooding conditions are not occurring and performs a normal operation. That is, when the flooding conditions are not occurring, the controller 100 controls the switch 120 such that power from the battery 130 is supplied to the controller 100, the RF module 140, and the plurality of ICs 150, which are included in the portable terminal, through the switch 120.

The humidity sensor 110 measures peripheral humidity of the portable terminal and provides the measured humidity value to the controller 100. The humidity sensor 110 may periodically measure peripheral humidity and may provide the measured humidity value to the controller 100. The humidity sensor 110 may compare a currently measured humidity value with a previously measured humidity value and may provide the currently measured humidity value to the controller 100 when a difference value between the two humidity values is greater than or equal to a threshold value. The humidity sensor 110 may be any one of a variety of conventional types of humidity sensors.

The switch 120 blocks power supplied from the battery 130 or transmits the power to the RF module 140 and the plurality of ICs 150, which are included in the portable terminal, according to a control signal of the controller 100. That is, the switch 120 performs a switching operation according to control of the controller 100. That is, the switch 120 connects a power supply line between the battery 130 and all components that use power of the battery 130 among components included in the portable terminal, or disconnects the power supply line between the battery 130 and all the components which use the power of the battery 130.

The battery 130, mounted internally or external to the portable terminal, supplies power to components in the portable terminal through the switch 120.

The RF module 140 transmits and receives signals with an external device according to control of the controller 100. The RF module 140 performs a normal operation when power from the battery 130 is supplied through the switch 120. Power of the RF module 140 is turned off when the power supplied from the battery 130 is not supplied through the switch 120.

The plurality of ICs 150 may include a variety of ICs that use power from the battery 130 in the portable terminal. Each of the plurality of ICs 150 performs a normal operation when power supplied from the battery 130 is supplied through the switch 120. Power for each of the plurality of ICs 150 is turned off when the power supplied from the battery 130 is not supplied through the switch 120. Herein, each of the plurality of ICs 150 may include a Power Management IC (PMIC) (not shown). That is, the PMIC blocks power supply to a variety of components that receive power from the battery 130 when the power from the battery 130 is not supplied. For example, the PMIC blocks power supply to the humidity sensor 110 when the power from the battery 130 is not supplied.

As described above, the controller 100 receives a humidity value from the humidity sensor 110, determines whether flooding conditions occur based on the humidity value, and controls the switch 120. However, in accordance with another method, the humidity sensor 110 may determine whether flooding conditions occur based on a currently measured humidity value and may directly control the switch 120. That is, the humidity sensor 110 may output a signal for controlling blocking of power supply to the switch 120 when a currently measured humidity value is greater than a predetermined threshold humidity value.

The method described above in relation with FIG. 1 under of the present invention may be provided as one or more instructions in one or more software modules stored in the respective portable terminals.

FIG. 2 is a flowchart illustrating a process of controlling power of a portable terminal according to an embodiment of the present disclosure.

Referring to FIG. 2, the portable terminal periodically measures humidity in step 201. The portable terminal proceeds to step 203 and compares the measured humidity value with a predetermined threshold humidity value. Herein, the threshold humidity value may be preset in the portable terminal when designing, manufacturing, or programming the portable terminal.

If the currently measured humidity value is greater than the threshold humidity value as a result of the comparison, the portable terminal proceeds to step 205 and releases a line connection between a battery associated with the portable terminal and a variety of components that receive power from the battery using a switch. The portable terminal proceeds to step 207 and turns off its power. That is, when the currently measured humidity value is greater than the threshold humidity value, the portable terminal determines that it is in a flooded state. The portable terminal blocks the power supply to a variety of components included in the terminal and turns off its power by releasing connection with the battery.

Alternatively, when the currently measured humidity value is less than or equal to the threshold humidity value as a result of the comparison, the portable terminal performs the processing from step 201 again. The portable terminal maintains a power-on state by maintaining the line connection between the battery associated with the terminal and the variety of components that receive power from the battery, and supplying the power of the battery to the variety of components.

Therefore, the portable terminal according to the present disclosure prevents a short circuit, etc. from being generated by flooding conditions and prevents its internal components from being damaged by sensing the flooding conditions using a humidity sensor and turning off power of the portable terminal by blocking power supplied from a battery when sensing the flooding conditions.

Methods according to claims of the present disclosure and/or embodiments described in the specification of the present disclosure may be implemented as hardware, software, firmware, or any combination thereof.

When the method is implemented as software, a computer-readable storage medium for storing one or more programs (software modules) may be provided. The one or more programs stored in the computer-readable storage medium are configured for being executed by one or more processors in an electronic device. The one or more programs include instructions for allowing an electronic device to execute the methods according to the claims of the present disclosure and/or the embodiments described in the specification of the present disclosure.

These programs (software module, software) may be stored in a Random Access Memory (RAM), a non-volatile memory including a flash memory, a Read Only Memory (ROM), an Electrically Erasable Programmable ROM (EEPROM), a magnetic disc storage device, a Compact Disc-ROM (CD-ROM), a Digital Versatile Disc (DVD) or an optical storage device of a different type, and a magnetic cassette. Alternatively, the programs may be stored in a memory configured by a combination of some or all of these. Also, the configured memory may include a plurality of memories.

The programs may be stored in an attachable storage device capable of being accessed through communication networks such as the Internet, an intranet, a Local Area Network (LAN), a Wide LAN (WLAN), and a Storage Area Network (SAN), or a communication network configured by a combination of these.

The storage device may connect to an electronic device through an external port. Also, a separate storage device on a communication network may connect to a portable electronic device.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. A method to control power of a portable terminal, the method comprising:
   measuring, by a humidity sensor, a current humidity value around the portable terminal;
   forwarding, by the humidity sensor, the current humidity value if a difference between the current humidity value and a previously measured humidity value is greater than or equal to a threshold value;
   determining, by a controller, whether a flooding condition occurs as a function of a predetermined threshold humidity value and the forwarded current humidity value;
   outputting, by the controller, a control signal for turning off power to a switch if the forwarded current humidity value is greater than the predetermined threshold humidity value; and
   turning off, by the controller, the power to the portable terminal according to the control signal.

2. The method of claim 1, wherein determining, by the humidity sensor, whether the flooding condition occurs comprises:
   determining that the flooding condition does occur if the forwarded current humidity value is greater than the predetermined threshold humidity value; and
   determining that the flooding condition does not occur if the forwarded current humidity value is less than or equal to the predetermined threshold humidity value.

3. The method of claim 1, wherein turning off, by the switch, the power to the portable terminal comprises disconnecting a battery from at least one component of the portable terminal using the switch that connects the battery with the at least one component of the portable terminal, wherein the battery supplies power to the portable terminal.

4. The method of claim 3, wherein the at least one component is an integrated circuit configured to receive power from the battery.

5. The method of claim 4, wherein the integrated circuit is configured to block a power supply to at least one other component that receives power from the battery.

6. The method of claim 4, wherein the integrated circuit is a power management integrated circuit (PMIC).

7. An apparatus to control power for a portable terminal, the apparatus comprising:
   a controller configured to perform at least one function of the portable terminal; and
   a humidity sensor configured to:
      measure a current humidity value around the portable terminal, and
      forward the current humidity value if a difference between the current humidity value and a previously measured humidity value is greater than or equal to a threshold value,
   wherein the controller is further configured to:
      determine whether a flooding condition occurs as a function of a predetermined threshold humidity value and the forwarded current humidity value,
      output a control signal for turning off power to a switch if the forwarded current humidity value is greater than the predetermined threshold humidity value, and
      turn off the power to the portable terminal according to the control signal.

8. The apparatus of claim 7, wherein the humidity sensor is further configured to determine that the flooding condition does occur if the forwarded current humidity value is greater than the predetermined threshold humidity value, and determine that the flooding condition does not occur if the forwarded current humidity value is less than or equal to the predetermined threshold humidity value.

9. The apparatus of claim 7, wherein the switch is configured to connect a battery with at least one component of the portable terminal, wherein the battery is configured to supply power to the portable terminal, wherein the humidity sensor is further configured to output the control signal, to the switch, to disconnect the battery from the at least one component of the portable terminal when determining that the flooding condition occurs, and wherein the switch is further configured to disconnect the battery from the at least one component as a function of the control signal.

10. The apparatus of claim 9, wherein the at least one component is an integrated circuit configured to receive power from the battery.

11. The apparatus of claim 10, wherein the integrated circuit is configured to block a power supply to at least one other component that receives power from the battery.

12. The apparatus of claim 10, wherein the integrated circuit is a power management integrated circuit (PMIC).

13. The apparatus of claim 9, wherein the battery is mounted inside the portable terminal.

14. A portable terminal, comprising:
a radio frequency (RF) module;
a controller configured to perform at least one function of the portable terminal; and
a power control apparatus, the power control apparatus comprising:
a humidity sensor configured to:
measure a current humidity value around the portable terminal, and
forward the current humidity value if a difference between the current humidity value and a previously measured humidity value is greater than or equal to a threshold value,
wherein the controller is further configured to:
determine whether a flooding condition occurs as a function of a predetermined threshold humidity value and the forwarded current humidity value,
output a control signal for turning off power to a switch if the forwarded current humidity value is greater than the predetermined threshold humidity value, and
turn off the power to the portable terminal according to the control signal.

15. The portable terminal of claim 14, wherein the humidity sensor is further configured to determine that the flooding condition does occur if the forwarded current humidity value is greater than the predetermined threshold humidity value, and determine that the flooding condition does not occur if the forwarded current humidity value is less than or equal to the predetermined threshold humidity value.

16. The portable terminal of claim 14, wherein the switch is configured to disconnect a battery from at least one component of the portable terminal, wherein the battery is configured to supply power to the portable terminal, wherein the humidity sensor is further configured to output the control signal, to the switch, to disconnect the battery from the portable terminal when determining that the flooding condition occurs, and wherein the switch is further configured to disconnect the battery from the at least one component of the portable terminal as a function of the control signal.

17. The portable terminal of claim 16, wherein the at least one component is an integrated circuit configured to receive power from the battery.

18. The portable terminal of claim 17, wherein the integrated circuit is configured to block a power supply to at least one other component that receives power from the battery.

19. The portable terminal of claim 17, wherein the integrated circuit is a power management integrated circuit (PMIC).

20. The portable terminal of claim 16, wherein the battery is mounted inside the portable terminal.

* * * * *